Nov. 11, 1930.  J. Z. HARNER ET AL  1,781,386
TOP BURNER FOR GAS STOVES
Filed March 3, 1928
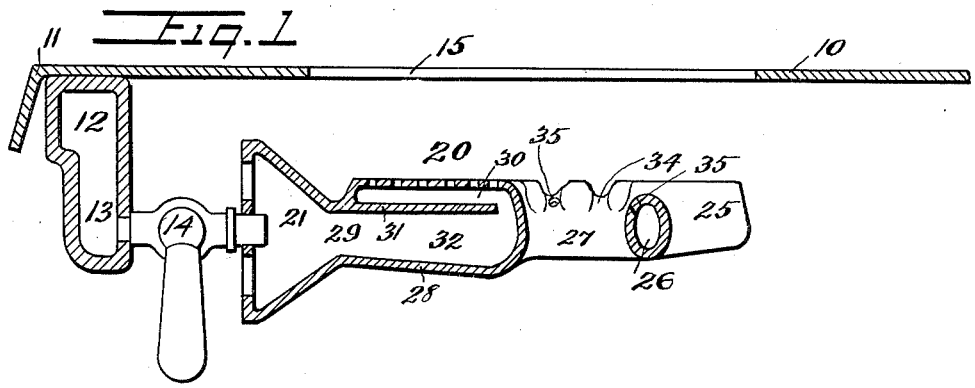
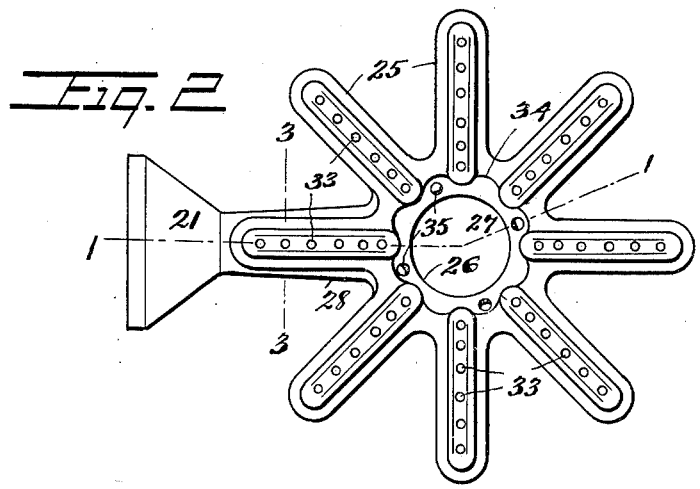
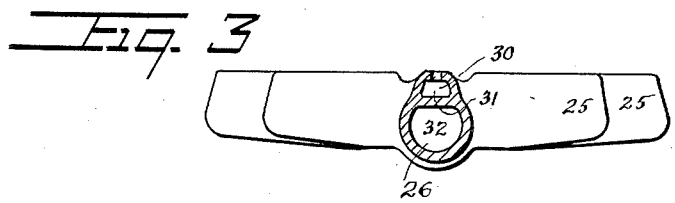
John Z. Harner, and
Harrison S. Schweinhart  *Inventors*
By W.H.D.M. Stewart
  *Attorney*

Patented Nov. 11, 1930

1,781,386

UNITED STATES PATENT OFFICE

JOHN Z. HARNER AND HARRISON S. SCHWEINHART, OF BOYERTOWN, PENNSYLVANIA, ASSIGNORS TO THE UNION MANUFACTURING COMPANY, OF BOYERTOWN, PENNSYLVANIA, A CORPORATION OF PENNSYLVANIA

TOP BURNER FOR GAS STOVES

Application filed March 3, 1928. Serial No. 258,985.

This invention relates to gas stoves and particularly to top-burner mechanism therefor; the main object being to provide an improved burner of compacted form whereby proper primary mixing will be effected and more perfect combustion of the discharging mixture will be insured. The invention is fully described in connection with the accompanying drawings and the novel features are clearly defined in the subjoined claims.

Fig. 1 is a sectional elevation of our improved burner, shown in cock-controlled connection with the manifold and in advantageous relation to the top plate and grate indicated; the burner section being taken on the line 1—1 of Fig. 2.

Fig. 2 is a corresponding plan view of the burner; and Fig. 3 is a cross-sectional view thereof on the line 3—3 of Fig. 2.

The top plate 10 of the stove, as indicated, is provided with a forwardly projecting down-turned shield portion 11, below which the so-called manifold or gas tube 12 is located with its depending cock connections 13 having the several straight-flow burner cocks 14 secured thereto as usual. The burner 20 is arranged centrally below the open top grate at 15; with its mixer head 21 in central communication with the gas supply cock 15 and with the usual surrounding air-inlets and shutters.

The advantageous arrangement particularly shown would ordinarily bring the burner so close to the front of the stove and to the gas cock 14 as to unduly limit the primary mixing flow between the mixer head 21 and the center of the burner; but the present invention provides a correspondingly compacted structure in which there will be a sufficient length of flow to the main mixture chamber to insure a proper primary mixing of the gas and air, and also provides for securing a sufficient secondary flow of air to the discharging jets to insure desired complete combustion, as hereinafter fully set forth.

The burner 20, as shown, is of the ordinary star-shaped type, having burner arms 25 radiating from an annular mixing chamber 26 which surrounds a central air-flow opening 27; the combined gas and air being delivered to said annular chamber through the mixer head 21 and a connecting neck which provides a primary mixing chamber. In the present improved construction this primary mixing is effected in a special connecting neck 28, which extends from the throat portion 29 at the mixer head as an integral part of one of the burner arms 25, the primary mixing chamber 32 being arranged beneath the port chamber 30 of the latter with a partition 31 between them; the underlying chamber 32 being formed in the connecting neck and arranged in direct communication with the annular chamber 26. A compacted burner structure is thus provided which affords a satisfactorily long primary mixing chamber 32 before delivery to the main mixing chamber 26, from which latter distribution is made to the several arms 25.

The top wall of each of these hollow burner arms, which is provided with a series of burner ports 33 as usual, is arranged at a higher level than the top wall of that portion 34 of the annular chamber 26 which separates the inner ends of the arms; and direct ports 35 are provided from said chamber between the arms 25, in addition to the ports 33 in the arms 25. These supplemental ports 34 located between the inner ends of the arms 25, are at a lowered level and are arranged to discharge convergingly upward into the secondary air flow passing through the central opening 27; and the side walls of both the connecting portions 34 of the chamber and of the radiating burner arms 25, are shaped to converge upwardly so as to increase the flow and most effectively use the upward current of air which provides for complete combustion. Thus our invention as specifically set forth, enables the securing of both a satisfactory mixture and a perfect combustion thereof in an advantageously compacted structure.

What we claim is:

1. An integrally formed top burner for gas stoves comprising a burner head having a central secondary-air opening and a surrounding annular mixing chamber provided with radiating burner arms, and a communicating mixer head having a neck connection to said annular chamber with a primary-mixing chamber portion thereof underlying one of said burner arms and partitioned therefrom, and a throat portion adjacent the end of said arm; each of said radiating arms having a burner-port wall above the level of the connecting portions of said annular chamber, and said lower-level connecting portions having burner ports directed convergingly above said central opening.

2. An integrally formed top burner for gas stoves comprising a burner head having a central secondary-air opening and a surrounding annular mixing chamber provided with radiating burner arms, and a communicating mixer head having a neck connection to said annular chamber with a primary-mixing chamber portion thereof underlying one of said burner arms and partitioned therefrom, and a throat portion adjacent the end of said arm; each of said radiating arms having a burner-port wall above the level of the connecting portions of said annular chamber, and said lower-level connecting portions having burner ports directed convergingly above said central opening; the ported arms and said lower level connecting portions of the chamber being formed convergingly so as to direct secondary air to the respective ports.

3. The combination in a gas range having a burner housing, a manifold and a gas valve located in the said housing, a front burner located also in the said housing adjacent the manifold, the said burner having a plurality of radially extending narrow arms, each arm having burner openings in its top, a mixing tube having its outer end in communication with the said valve and its inner end in communication with one of said arms only, the last said arm having a narrow baffle plate located therein above the inner end of the short mixing tube, the parts combined as and for the purpose set forth.

4. In a gas range, a burner housing, a manifold and a gas valve embraced in the outer portion of said housing, a burner located in the said housing, the burner comprising a plurality of radially extending arms, a short manifold having its outer end communicating with the said gas valve and its inner end communicating with the outer end of one of said arms, and a baffle plate located in said arm below the inner side of its upper wall and above the inner end of the said short mixing tube, said baffle plate extending only substantially to the center of the said burner, the parts combined as and for the purpose set forth.

In testimony whereof we affix our signatures.

JOHN Z. HARNER.
HARRISON S. SCHWEINHART.